May 30, 1933.　　　O. U. ZERK　　　1,912,238
LUBRICATING APPARATUS
Filed May 19, 1930　　　2 Sheets-Sheet 1
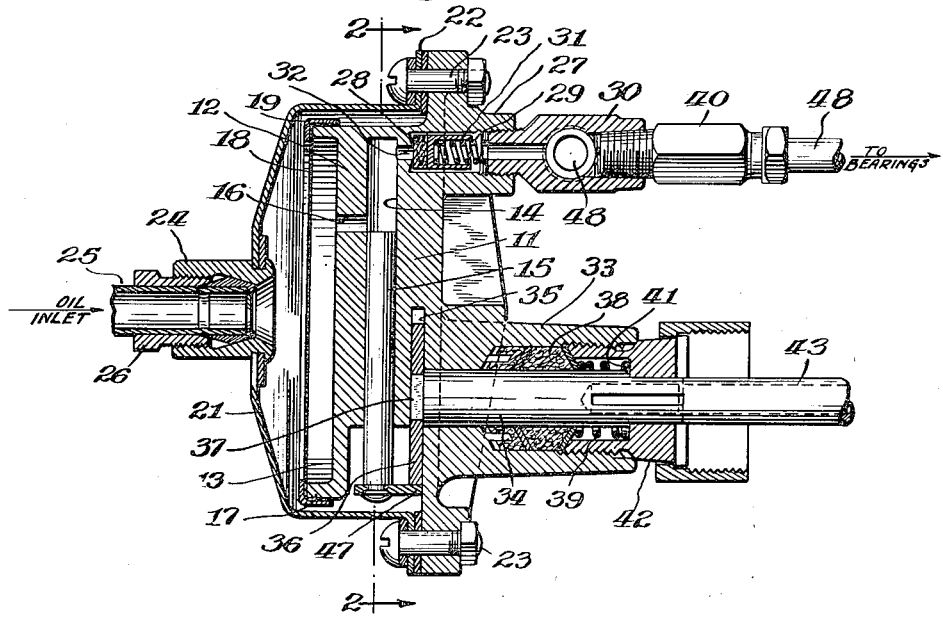
Inventor
Oscar U. Zerk
By Williams, Bradbury, McCaleb & Hinkle
Attys.

May 30, 1933. O. U. ZERK 1,912,238
LUBRICATING APPARATUS
Filed May 19, 1930 2 Sheets-Sheet 2
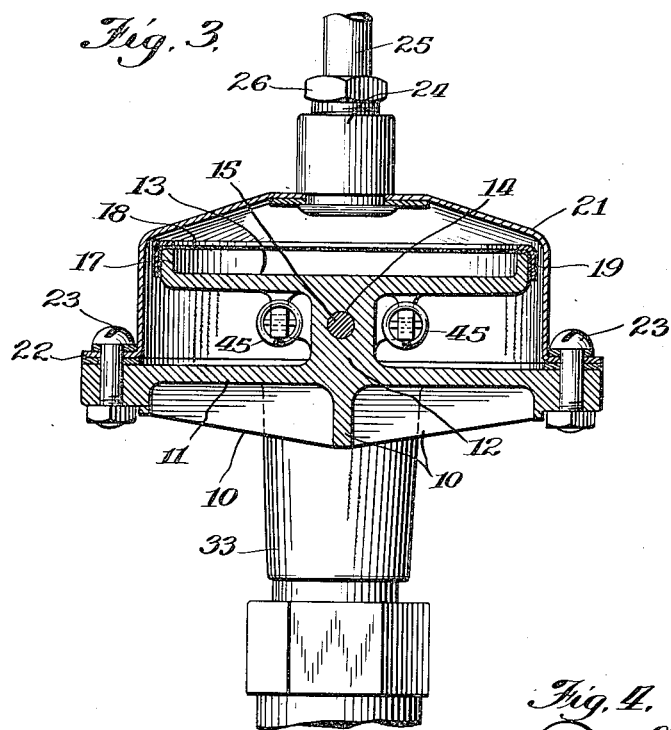
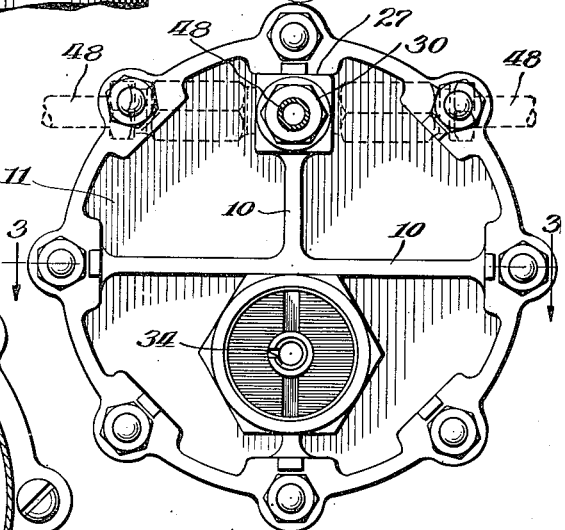
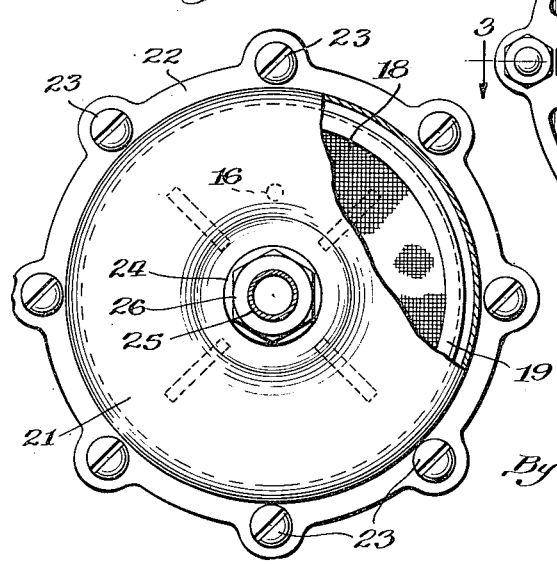
Inventor
Oscar U. Zerk.
By Williams, Bradbury, McCaleb & Hinkle
Attys.

Patented May 30, 1933

1,912,238

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed May 19, 1930. Serial No. 453,495.

My invention relates to a lubricating apparatus and particularly to lubricating apparatus for intermittently supplying lubricant to the vehicle bearings.

An object of the invention is to provide a new and improved apparatus for supplying lubricant to the chassis bearings of a motor vehicle.

A further object is to provide a lubricant distributing pump which is sturdy in construction and comprises relatively few parts.

A further object is to provide a lubricant distributing apparatus in which a single casting supports the operating parts and at the same time forms a portion of the housing for a lubricant pump.

A further object is to provide a lubricant distributing pump which is effective in operation and inexpensive to manufacture.

In accordance with the general features of the invention a lubricant distributing pump adapted to be supplied with lubricant from a reservoir is provided having a reciprocable piston for intermittently supplying lubricant to the vehicle bearings.

Referring to the drawings:

Fig. 1 is a longitudinal section of the apparatus embodying my invention and is taken on line 1—1 of Fig. 2;

Fig. 2 is a cross-section of the apparatus taken on line 2—2 of Fig. 1;

Fig. 3 is a longitudinal section taken on line 3—3 of Fig. 4;

Fig. 4 is a bottom view of the apparatus shown in Fig. 3; and

Fig. 5 is a plan view of the apparatus shown in Fig. 3.

The apparatus comprises a lubricant distributing device having a base 11 carrying a cylinder block 12 which supports a plate 13. The base cylinder block and plate 13 are cast integrally. In order to strengthen the base a plurality of reinforcing ribs 10 may be integrally provided on the outer face of plate 11. The cylinder block is provided with a cylindrical bore 14 adapted to have a piston 15 reciprocably mounted therein. Immediately in front of the retracted position of the piston is a passage 16 extending from the cylinder through plate 13. Plate 13 is provided with a peripheral flange 17 upon which a filter member 18 is secured by an annular ring 19 which is pressed over flange 17 to securely retain the filter member upon the flange, thus forming a chamber for the filtered lubricant between the filter member 18 and the plate.

A cap 21 having a radial flange 22 is adapted to enclose the cylinder block and is secured to the base of the device by a plurality of bolts 23. Riveted into the head of the cap is a plug 24 in which a supply tube 25 is secured by a plug 26. The space within the enclosure formed by the cap and base of the device is adapted to be supplied with lubricant from a reservoir at a higher level than the pump so as to supply the lubricant thereto by gravity or the lubricant may be supplied thereto by the pump which distributes the lubricant for the engine of the motor vehicle as shown in my co-pending application Serial No. 453,486, filed May 19, 1930.

The base of the device is provided with an integral boss 27 having a cylindrical bore which forms a valve chamber comprising a valve member 28 which is retained upon its seat by the pressure of a spring 29. The end of spring 29 engaging the valve member 28 is enclosed in a cup-shaped cap 31 which serves to increase the contact surface of the spring against the valve member and also to guide the spring. The opposite end of spring 29 rests against plug 30 threaded into the end of boss 27. Plug 30 is provided with a plurality of threaded apertures through which connection is made with distributing lines 48 which are connected to plug 30 by means of plugs 40. Three distributing lines have been shown although it is evident that a lesser or greater number may be used depending upon the number and location of the bearings to be lubricated, each supply line 48 supplying a number of bearings. The valve chamber communicates with the end of cylinder 14 through a passage 32. The base 11 of the distributing device is provided with a second and larger boss 33 which forms a bearing for a shaft 34.

A slot 35 is provided between the base plate 11 and cylinder block 12 which is adapted to receive a rotatable cam 36. The end of shaft 34 is provided with a square head 37 adapted to fit into a similarly shaped aperture in the cam whereby the cam and shaft will rotate in unison. A packing member 38 surrounds shaft 34 and is held in firm engagement with the shaft by means of a spring 39 for preventing the leakage of lubricant past the shaft. The shaft 34 is provided with a shoulder 41 which is engaged by a plug 42 threaded into the end of boss 33, thereby preventing the shaft from being withdrawn from operating engagement with cam 36. The distributing device may be mounted on the transmission box of the motor vehicle and shaft 34 may be actuated by connecting it with the gear mechanism in the transmission box or the shaft may be actuated by a flexible drive 43 connected to the drive shaft as disclosed in my co-pending application Serial No. 453,489, filed May 19, 1930.

Piston 15 has a T-shaped cross-piece 44 secured to the end thereof which projects from the cylinder. Connected to the arms of this cross-piece is a pair of springs 45, the opposite ends of which are secured to lugs 46 formed integral with plate 13. These springs serve to move the piston forwardly by exerting a longitudinal force thereon. By providing two springs as shown the cylinder and piston may be made extremely short without causing binding of the piston in the cylinder because the force exerted on the piston is parallel to the cylinder bore. Cross-piece 44 is provided with a projection 47 which extends into the path of the rotating cam 36. The periphery of the cam is spiral-shaped and has a sharp radial offset interconnecting the beginning and end of the spiral. Thus, as the cam rotates the cross-piece will be moved outwardly, withdrawing the piston from the cylinder until the off-set in the cam reaches the projection 47, when the springs become effective to move the piston forwardly to force lubricant from the cylinder into distributing lines 48.

The operation of the apparatus is as follows: The shaft 34 when connected to the flexible drive 43 referred to above will rotate at a speed of approximately five revolutions per mile for each mile travelled by the motor vehicle, thus causing the piston 15 to be reciprocated five times per mile. It has been found to be unnecessary to provide the end of the piston with a packing cup due to the fact that the lubricant is supplied to the distributing device, making it unnecessary for the suction stroke of the piston to draw lubricant into the distributing device. Upon the forward stroke of the piston the lubricant forms a sufficient seal around the piston to cause the expulsion of lubricant through valve 28. Spring 29 is made strong enough to prevent any lubricant from passing into the valve chamber unless the piston is actuated forwardly. Thus, for each forward movement of the piston a measured amount of lubricant is supplied to the lubricant distributing lines 48. The apparatus is adapted to be used in connection with resistance units of the type disclosed in my copending application Serial No. 207,609, filed July 22, 1927, now Patent No. 1,797,280, which are interposed between the distributing lines 48 and the bearings to be lubricated to apportion the lubricant among the various bearings.

Having described the nature and embodiments of my invention, what I desire to secure by United States Letters Patent is as follows:

1. In a lubricating apparatus, a lubricant distributing line, a distributing pump comprising a casting having a base portion, a plate having a peripheral flange and spaced therefrom, a cylinder block interconnecting the base portion and said plate, said cylinder block having a tubular bore forming a cylinder, a piston movable therein, an intake passage in the wall of said cylinder in front of the retractile position of the piston, an outlet passage at the protractile position of the piston, a filter member secured to the peripheral flange of said plate, and means for reciprocating the piston to force lubricant into said distributing line.

2. In a lubricating apparatus, a lubricant distributing line, a distributing pump comprising a casting having a base portion, a cap fitting over said base portion to form a housing, a plate having a peripheral flange and being integral with said base portion, a filter member secured to said flange, a cylinder formed in the casting between said plate and base portions, a piston reciprocable in said cylinder, and means for actuating said piston to expel lubricant from the pump to said distributing line.

3. In a lubricating apparatus for a motor vehicle, a lubricant pump comprising a base portion, a cylinder mounted thereon, a plate carried thereby having a peripheral flange, a filter member supported on the flange of said plate, a piston movable in said cylinder, a cam rotatably mounted between the cylinder and base and adapted upon rotation to move the piston forwardly, a spring for retracting the piston, a shaft extending through said base for rotating the cam, and a cap fitting over said cylinder and plate and secured to said base, said cap being provided with a tube for supplying lubricant to the pump.

4. In a lubricating apparatus for a motor vehicle, a lubricant pump comprising a base, a boss integral with said base forming a bearing, a shaft in said bearing adapted to be actuated by power from the vehicle, a cylinder mounted on said base providing a slot between the cylinder and base, a cam rotatably mounted in said slot and adapted to be actuated by said shaft, a piston in said cylinder, a cross-piece carried by the piston having a projection engageable by said cam, a spring secured to said cross-piece for moving the piston forward, and a cap enclosing the cylinder and forming a housing with the base.

5. In a lubricating apparatus for a motor vehicle, a base, a cylinder block cast integral therewith providing a slot between the base and the cylinder block, a cam mounted within said slot, a shaft adapted to be mounted on said base and adapted to project into said cam forming a driving connection therewith, means for preventing longitudinal movement of the shaft, means for rotating said shaft and cam, a piston reciprocable within the cylinder, a projection carried by the piston extending into the path of the cam, the rotation of the cam retracting the piston in the cylinder, and a spring for moving the piston forwardly to supply lubricant to said distributing line.

In witness whereof, I hereunto subscribe my name this 14th day of May, 1930.

OSCAR U. ZERK.